US007068795B2

(12) United States Patent
Kennedy et al.

(10) Patent No.: US 7,068,795 B2
(45) Date of Patent: Jun. 27, 2006

(54) PUBLIC ADDRESS SYSTEM AND METHOD FOR AN URBAN TRANSIT VEHICLE

(75) Inventors: James D. Kennedy, Raleigh, NC (US); John R. Rowlette, Jr., Raleigh, NC (US)

(73) Assignee: Digital Recorders, Inc., Dallas, TX (US)

(*) Notice: Subject to any disclaimer, the term of this patent is extended or adjusted under 35 U.S.C. 154(b) by 223 days.

(21) Appl. No.: 10/417,383

(22) Filed: Apr. 16, 2003

(65) Prior Publication Data

US 2003/0194096 A1 Oct. 16, 2003

Related U.S. Application Data

(63) Continuation of application No. 09/520,689, filed on Mar. 7, 2000, now abandoned.

(51) Int. Cl.
*H04R 27/00* (2006.01)
*H04B 1/00* (2006.01)

(52) U.S. Cl. .......... 381/82; 381/86

(58) Field of Classification Search .......... 381/77, 381/82, 71.1, 71.4, 71.5, 94.1, 94.7, 86, 92; 340/433, 460
See application file for complete search history.

(56) References Cited

U.S. PATENT DOCUMENTS

| | | | | | |
|---|---|---|---|---|---|
| 3,906,472 | A | * | 9/1975 | Guadara et al. | 455/99 |
| 4,536,887 | A | * | 8/1985 | Kaneda et al. | 381/94.1 |
| 5,193,141 | A | | 3/1993 | Zwern | 395/2 |
| 5,459,702 | A | | 10/1995 | Greenspan | 369/25 |
| 5,463,694 | A | * | 10/1995 | Bradley et al. | 381/92 |
| 5,467,071 | A | | 11/1995 | Koenig | 340/433 |
| 6,522,754 | B1 | * | 2/2003 | Long et al. | 381/82 |

* cited by examiner

*Primary Examiner*—Brian Tyrone Pendleton
(74) *Attorney, Agent, or Firm*—Michael A. O'Neil

(57) ABSTRACT

Apparatus and method for allowing an operator of a transit vehicle to make public address announcements to passengers internal and external to the vehicle. The safety of the vehicle and passengers is maintained through providing a hands-free directional microphone having noise canceling characteristics. The microphone is used as an input device for receiving an audio signal and provides the signal to a processing module that converts the signal into a digital signal. The digital signal is then processed by a digital signal processor to cancel undesirable noise common to a transit vehicle. The noiseless signal can then be converted into an analog signal and recorded within the memory of the public address system where, upon needed, the signal can be transferred to an output device such as a speaker system internal or external to the vehicle. After playback, the recorded message can also be easily repeated by means of a repeat switch.

1 Claim, 5 Drawing Sheets

PUBLIC ADDRESS SYSTEM AND METHOD FOR AN URBAN TRANSIT VEHICLE

This application is a continuation of Ser. No. 09/520,689 filed Mar. 7, 2000, abandoned.

FIELD OF THE INVENTION

The present invention generally relates to public address systems. More particularly, the invention is directed to apparatuses and methods for providing a noiseless public address announcement in a transit vehicle without compromising the safety of the vehicle or the passengers within.

BACKGROUND OF THE INVENTION

The duties of a bus driver, and other operators of modern urban transit vehicles, have grown increasingly complex. Maneuvering an oversized vehicle through mazes of streets and highways in dense traffic requires constant attention by the driver. While technology has well provided buses with a number of tools useful in maintaining the safety and comfort of the vehicle's occupants, these adaptations can themselves become distractions for an already overburdened driver. In the interest of safety, it is important to keep the driver focused on the road ahead.

People riding on a bus often require information as they ride. One important piece of information that passengers need to know on a timely basis is the name of the next place that the bus will stop, so that passengers who intend to disembark can prepare themselves. In most cases, the bus driver is the only person available to announce that type of information. Because the information must be announced while the bus is actually in route, a time when the driver is busy actually navigating the streets, the driver making the announcement needs to be able to do so with a minimum amount of distractions.

In order to accommodate the necessity of making announcements, most buses come equipped with a microphone connected to a public address (PA) system that amplifies the voice spoken into the microphone so that the announcement can be heard from speakers throughout the interior of the bus. Microphones commonly used in buses include microphones mounted on gooseneck holders, handheld microphones, and lapel microphones. In order to use a gooseneck microphone, the driver must reach for the microphone, pull it into position in front of him mouth, make the announcement, and then replace the microphone in a location out of his way. Additionally, the gooseneck microphone, when pushed aside, may block some of the peripheral view of the driver. To use a hand held microphone, a bus driver must pick up the microphone from its holder, hold it in front of his mouth, make the announcement, and then replace the microphone in its holder. To use a lapel microphone, a driver must locate the microphone, move his lapel toward his mouth and make the announcement. In all of these cases, it is likely that the bus driver will need to stop looking at the road for at least a moment, as well as take a hand off the steering wheel.

Currently, pre-recorded announcements are used to make announcements which can be scheduled. These scheduled announcements can be made with a minimal amount of driver distraction, however, scheduled announcements cannot accommodate the unavoidable changes that can be expected in the daily operation of an urban transit vehicle. A pre-recorded announcement system, to have the kind of versatility needed, would have to be supplemented by a live microphone to provide current transit information.

Therefore, there is a need for a public address system capable of hands-free operation and providing current transit information to passengers in a safe manner.

SUMMARY OF THE INVENTION

Accordingly, an urban transit vehicle announcement system is needed which allows the operator to make the necessary announcements with hands-free operation, providing minimal distraction and without blocking the operator's view.

There is also a need for a public address system that records announcements for immediate playback, thereby reducing feedback which results from using a sensitive microphone.

In accordance with one aspect of the invention, an urban transit vehicle announcement system is disclosed which includes a microphone mounted on the casing of the vehicle's steering column. The microphone advantageously permits the operator to make announcements to the passengers inside and outside the vehicle without having to position a gooseneck, pick up a handheld microphone or keep track of a lapel microphone. The microphone provides hands-free public address operation to the vehicle operator.

According to another aspect of the invention, a microphone element is provided with a very narrow pickup pattern and a noise canceling design.

In one form, the invention relates to a public address system for an urban transit vehicle comprising a steering column, a cowl around at least a portion of the steering column, a microphone to collect audio signals and convert the audio signals to electrical signals, an audio processor for recording the electrical signals and delaying the playback of the electrical signals to prevent feedback, an amplifier receiving electrical signals from the audio processor and converting the electrical signals to amplified electrical signals, speakers receiving amplified electrical signals from the amplifier and converting the amplified electrical signals to audio signals. Wherein the microphone is fixed to the cowl of the steering column.

In another form, the invention relates to the present invention and provides a public address system comprising a microphone for receiving an audio signal and converting the audio signal into an electrical signal, a processor module operably coupled to the microphone for reducing noise associated with the signal, a control element operably coupled to the microphone, and at least one output device for receiving and outputting the processed signal.

In a still further form, the invention relates to a method of providing a public announcement comprising the steps of receiving an audio signal via a microphone, converting the audio signal into an electrical signal, digitizing the electrical signal,canceling the noise in the digitized signal, converting the digital signal to analog form, recording the analog signal and outputting the analog signal to at least one output device.

In a still further form, the invention relates to a method of operating a public address system comprising the steps of actuating a switch to enable communication between a microphone and a processor for communicating an audio signal, inputting the audio signal, releasing the switch to disable the microphone, and outputting the signal to at least one output device.

These and other features of the invention will be more clearly understood and appreciated upon considering the detailed embodiments described hereinafter.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

The conceptual groundwork for the present invention involves providing a public address system that can be operated hands-free while providing clear, noiseless announcements to passengers that are both internal and external to a transit vehicle. The hands-free public address system of the instant invention receives an audible signal via a microphone and processes the signal to reduce undesirable noise. Noise reduction begins through utilizing a directional microphone having a narrow pick-up pattern and noise canceling characteristics. Undesirable noise is further reduced through digitizing the received audio signal and processing the signal using a digital signal processor (DSP). The DSP removes undesirable noise contained within the signal and not associated with the announcement to be communicated. For instance, the DSP uses an algorithm for removing engine noise, A/C noise, and general road noise not associated with the intended announcement. The noise-free signal can then be stored within a memory device and, when needed, the announcement can be retrieved and transferred to an output device such as a speaker.

Figure 1:
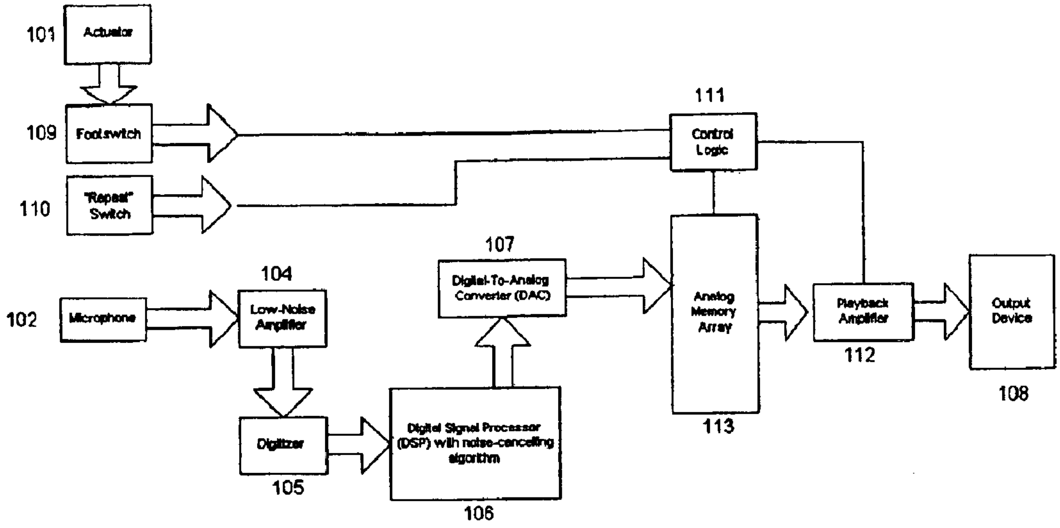
FIG. 1 is a simplified schematic diagram of a public address system according to a preferred embodiment of the present invention.

Referring to FIG. 1, a simplified schematic of a public address system according to a preferred embodiment of the present invention is shown. System 100 includes noise-canceling microphone 102 for receiving an audio signal or announcement from a vehicle operator. Microphone 102 is controlled by actuator 101 and switch 109 located near the foot of the operator and controlled by the operator's foot depressing switch 109. In other embodiments, microphone 102 can be controlled by paddle switches located on the steering wheel or by using a voice activated microphone that turns on when the user commands the microphone to turn on. All in all, the present invention is directed toward operating a microphone within a transit vehicle without the operator having to remove their hands from the steering wheel of the vehicle. Upon actuating hands-free microphone 102, the audio signal is received by microphone 102 and amplified using low-noise amplifier 104. The amplified signal is then fed to digitizer 105 where the signal is converted into a digital signal. Preferably, digitizer 105 has a high sample rate for providing excellent data integrity representative of the information originating from the audio signal detected by microphone 102.

The digital signal is then fed to DSP 106 where any undesirable noises such as background noise, engine noise, etc. are removed from the audio signal, using the DSP's noise canceling algorithms. The object of DSP 106 and algorithms is to eliminate noise from the audio signal which does not contribute to providing a clear public announcement. The output of the DSP 106 is a digital version of the input audio signal, with noise removed.

The digital signal output from DSP 106 is then fed to a Digital-to-Analog Converter (DAC) 107, which changes the signal back into an analog format. It will be appreciated by those skilled in the art that the Digitizer 105 and Digital-to-Analog Converter 107 are commonly supplied together as an audio CODEC (Coder-Decoder) device.

The audio signal output from the Digital-to-Analog Converter 107 is then fed into an Analog Memory Array 113 for temporary storage. Control Logic 111 supplies the necessary sequencing of signals to allow the audio signal to be stored in the Analog Memory Array 113, for later playback, through Playback Amplifier 112 into the external Output Device 108. In the preferred embodiment, Output Device 108 is a speaker system for providing audio output. However, other embodiments can include providing the signal to a display device for displaying the announcement in textual form for the hearing impaired. In either embodiment, a noiseless audio announcement is provided to individuals by the driver of a transit vehicle without the, driver having to compromise the safety of the individuals within the vehicle.

An optional Repeat Switch 110 may be provided which allows the last stored message to be replayed at the touch of the switch. Repeat Switch 110 and Foot Switch 109 are both inputs to Control Logic 111.

Figure 2:
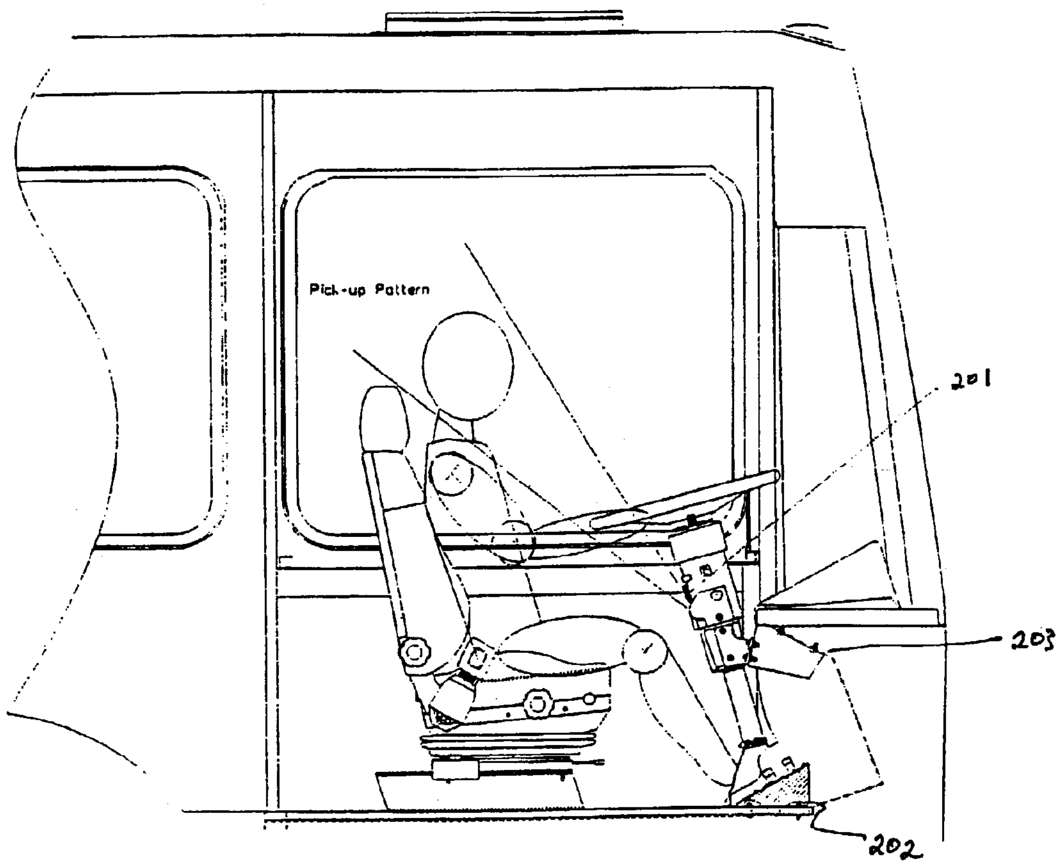
FIG. 2 illustrates an implementation of a public address system within a transportation vehicle according to a preferred embodiment of the present invention.

Referring now to FIG. 2, an illustration of an implementation of a public address system within a transportation vehicle according to a preferred embodiment of the present invention is shown. FIG. 2 depicts the driver's seat in the interior of an urban transit vehicle. The driver is positioned in a driver's seat where he can turn the vehicle by rotating the steering wheel. The steering wheel is mounted at the upper end of a steering column with the column enclosed in a plastic cowling. The road is viewed through the windows of the vehicle. Foot pedals to control acceleration and braking of the vehicle may be provided on the floor of the vehicle's interior.

In accordance with the invention, a microphone housing 201 containing a microphone is mounted on the case of the steering column. The microphone is selected to pick up a human voice at a distance of approximately one to two feet. The microphone is positioned just below the steering wheel on the steering column cowling facing the operator. The location of the microphone helps to provide clear, intelligible voice reproduction, and to reduce the background noise. The steering column provides the best on-axis alignment relative to the driver seat, regardless of size of the individual driver. The microphone's pickup pattern reduces unwanted background noise. The seat and legs of the operator also help to reduce reflections of undesirable noise, thus increasing the signal-to-noise ratio (SNR). By increasing the SNR, less processing is required to remove unwanted noise, therefore allowing a natural sounding recorded announcement. Foot switch 202 is located at the foot of the operator for controlling the activation of microphone housing 201. Preferably, foot switch 202 is located on the left side of the foot bay at a safe distance from the brake and accelerator foot pedals.

An optional LED (not shown) is available for dash mounting to indicate activation during PA announcements. Additionally, a green LED (not shown) is located on processor module 203 indicating activation. Processor module 203 is housed in a rugged low profile extruded black aluminum case and can be concealed anywhere. Preferably, processor module 203 is located in an unobtrusive location such as behind a panel near the PA amplifier. Additionally, the public address system utilizes the vehicle's power source and includes internally protective circuitry for ensuring safe operation of the public address system. The system does not obstruct the peripheral view of the operator in any manner nor does it interfere with the operation of the steering wheel or any other vehicular instrumentation or controls.

Figure 3:
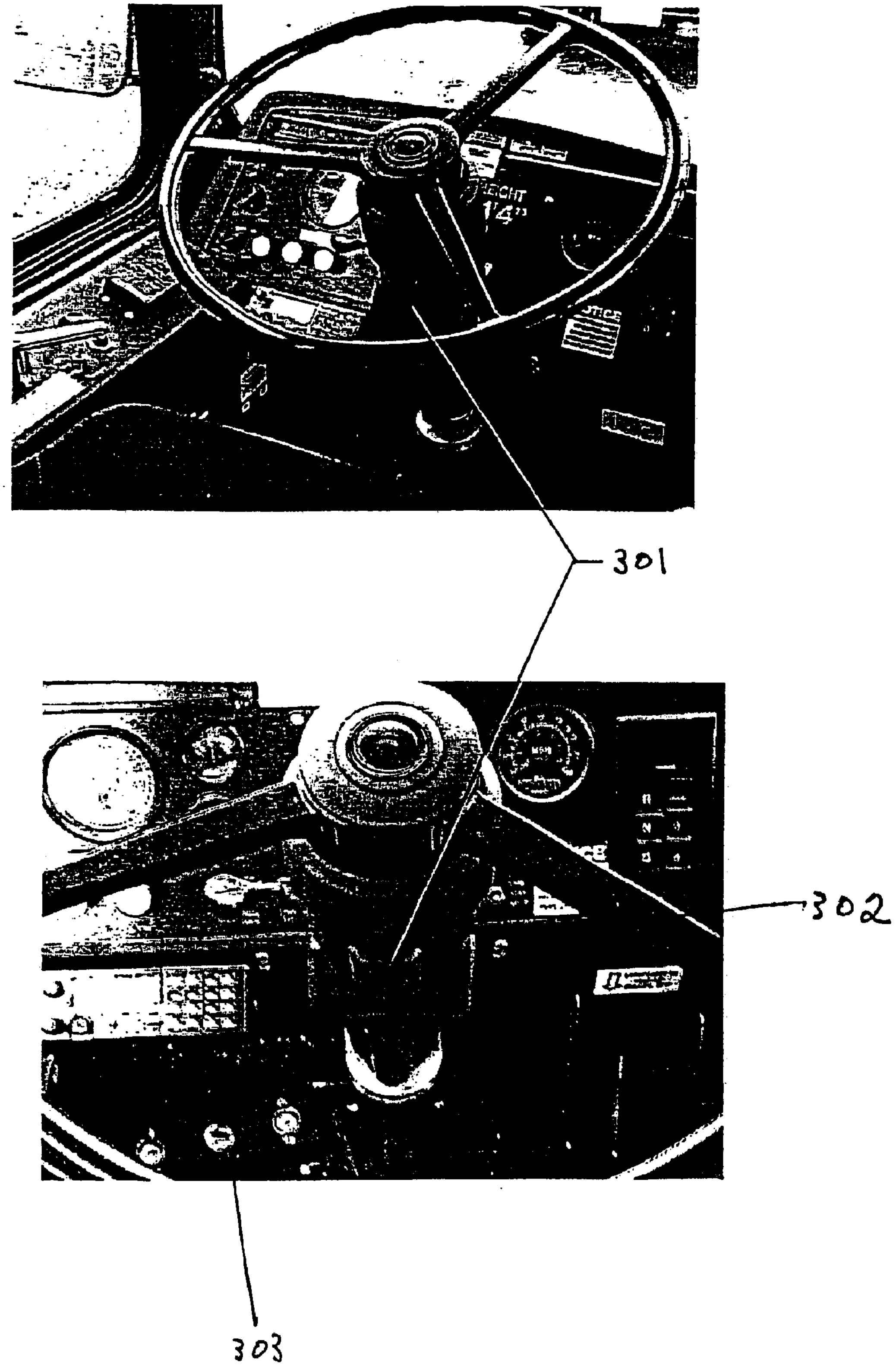
FIG. 3 illustrates an implementation of a microphone and control element within a transportation vehicle according to one embodiment of the present invention.

Referring now to FIG. 3, an implementation of a microphone and control element within a transportation vehicle according to one embodiment of the present invention is shown. Microphone housing 301 is made of a high impact molded resin and appears to be part of steering column housing 302. Microphone housing 301 is attached from behind steering column housing 302 using two screws, thus eliminating any visible sign of mounting hardware. Microphone housing 301 is a low profile vandal-proof enclosure with no exposed wiring or surface conduit and is mounted to steering column housing 302 with no visible screws for removal and no external buttons or operating controls.

Foot switch 303 is provided on the left hand side of the foot bay and allows the operator to make PA announcements via microphone within microphone housing 301. Preferably, foot switch 303 is a rugged transit style switch, and can be mounted in a heel or toe operation. In one embodiment, a single foot switch is provided for activating a microphone but other embodiments may include providing a plurality of foot switches for controlling the public address system. Mounting the microphone as illustrated in FIG. 3 allows the operator to make public address announcements to passengers without using a conventional gooseneck microphone, thus allowing safe operation of the vehicle.

Figure 4:
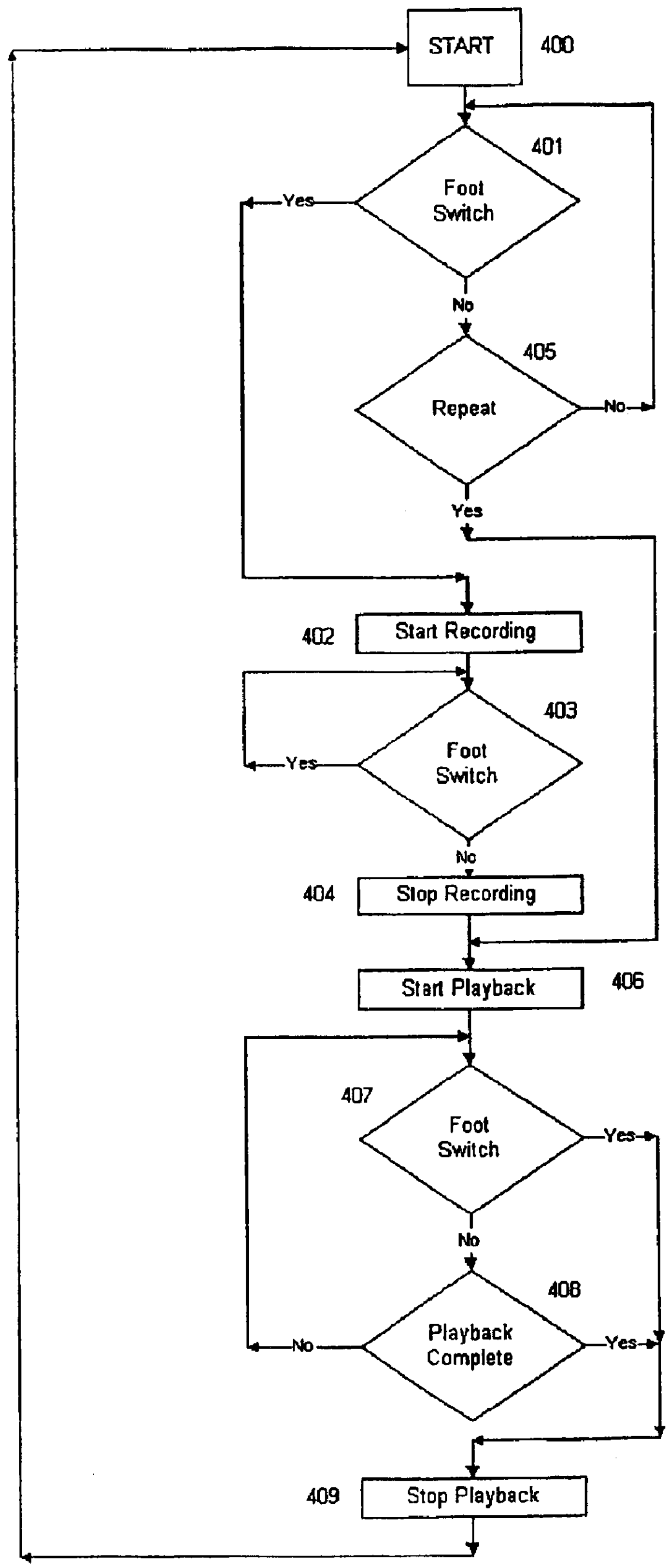
FIG. 4 is a block diagram illustrating a method of operating a public address system according to one embodiment of the present invention.

Referring now to FIG. 4, a block diagram illustrating a method of operating a public address system according to one embodiment of the present invention is shown. The method begins at the Start block 400 and proceeds to block 401. At block 401 the position of the Foot Switch is checked. If the operator has depressed the Foot Switch, the method proceeds to block 402, in which recording of the audio signal is started. However, if the Foot Switch was not depressed, then the method proceeds to block 405, where the status of the Repeat Switch is checked.

Assuming that the Foot Switch was depressed, the method proceeds to block 402, where recording of the audio signal into memory is started. The method then proceeds to block 403, where it waits for the Foot Switch to be released. When the Foot Switch is released, the method proceeds to block 404, which stops the recording process.

Once the recording process is stopped, the method proceeds to block 406, which starts playback of the previously recorded audio message. The method then proceeds to block 407, which checks to see if the Foot Switch is depressed, which would indicate that the operator is canceling the playback of the message. If the Foot Switch is not depressed, the method proceeds to block 408 and checks to see if the entire recorded message has been played back. If either condition is true (Foot Switch depressed or entire message played back) the method proceeds to block 409, which stops the playback process. If both conditions are false (Foot Switch is not depressed and playback of the message is not complete) then the method continues to check for those conditions.

Once playback is stopped at block 409, the method re-enters the top of the flowchart at block 400.

If the operator activated the Repeat Switch when checked by the method in block 405, then the previously recorded announcement would be played. In this case, the method would proceed from block 405 to block 406, where playback is started. From there the previously described sequence for message playback would be followed.

The operator has not had to remove his hand from the steering wheel, lean over to adjust the microphone, or take his eyes off the road thus providing a safe and effective means of communicating directly with the passengers.

The system requires no further action until another announcement is required at which time the process begins again. In the preferred embodiment, activation of the microphone overrides any previously recorded announcements, keeping the operator in full control of the vehicle announcement system. Additionally, volume control is achieved via the Operator Control Unit (OCU not shown) or through the public address system on a vehicle without previously recorded transit broadcast announcements.

In one embodiment of the present invention, the operator can select where the PA announcements are heard inside, outside, or both via a toggle switch (not shown). Additionally, an "emergency/tour" auxiliary microphone jack can be provided for allowing a regular hand operated microphone to be plugged in and override the hands-free microphone allowing the operator direct real-time announcement capability when required.

Figure 5:
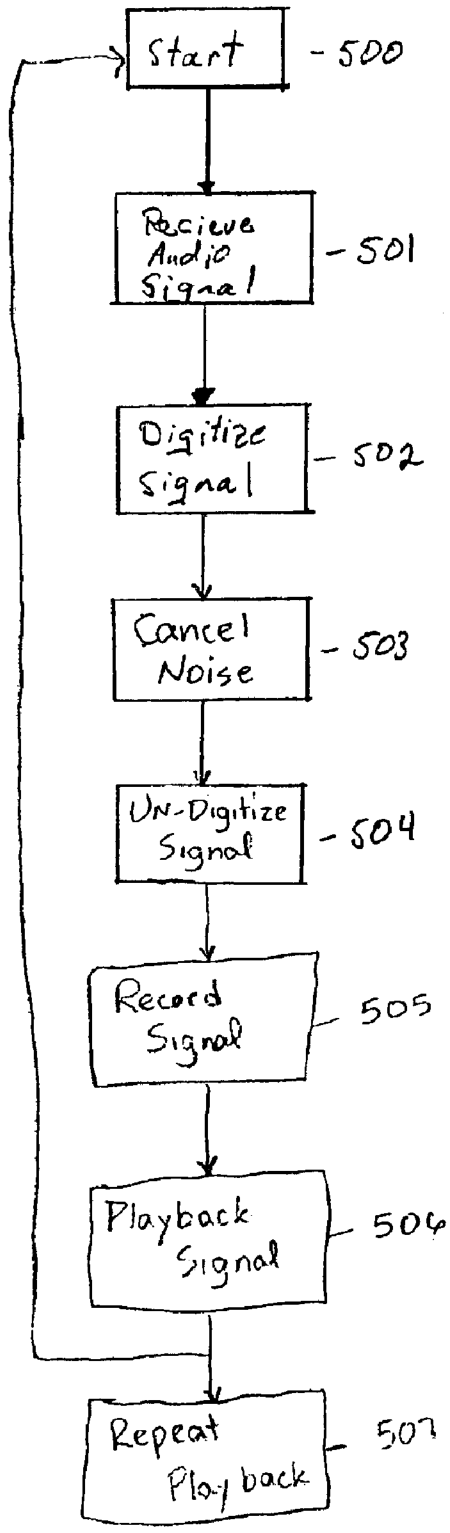
FIG. 5 is a block diagram illustrating a method of providing a public address announcement according to a preferred embodiment of the present invention.

Referring now to FIG. 5, a block diagram illustrating a method of providing a public address announcement according to a preferred embodiment of the present invention is shown. The method begins at block 500. At block 501 an audio signal is received through a highly directional noise canceling microphone element and amplified through a high quality low noise pre-amp. The method then proceeds to block 502 where the signal is digitized at a high sampling rate and fed to an audio processor. The method then proceeds to block 503 where the noise in the digitized signal is canceled using DSP noise canceling algorithms.

The method then proceeds to block 504 where the noise canceled digitized signal is converted back to analog form. In block 505, the analog signal is recorded utilizing any type of recording medium such as a memory device. In block 506, the recorded signal is played back. After the announcement has been played, the system either returns to start block

500 for recording a new message, or if a repeat switch is flipped, the playback of the message is repeated in block 507.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

We claim:

1. A public address system for an urban transit bus of the type including:

a passenger receiving interior space;

an operator's station located within the interior space;

a steering column within the operator's station; and a cowl around at least a portion of the steering column; the improvement comprising:

a noise-cancelling, directional microphone mounted on the cowl of the steering column for collecting audio signals and for converting the audio signals to electrical signals;

an audio processor mounted in a secure housing non-accessibly and unobtrusively located out of the operator's station adn behind a panel for receiving electrical signals from the microphone, for processing the electrical signals to remove noise therefrom, for recording the electrical signals, and for playing back the electrical signals following the recordal thereof to prevent feedback;

a foot switch located within the operator's station;

the audio processor being responsive to activation of the foot switch to cause recording of signals received through the microphone;

an amplifier for receiving electrical signals from said audio processor and for converting the electrical signals to amplified electrical signals;

speakers for receiving amplified electrical signals from the amplifier, for converting the amplified electrical signals to audio signals and for broadcasting the audio signals at least within the passenger receiving interior of the urban transit vehicle.

* * * * *